United States Patent [19]

Teratani et al.

[11] Patent Number: 5,001,185

[45] Date of Patent: Mar. 19, 1991

[54] RUBBER COMPOSITIONS

[75] Inventors: Hiroyuki Teratani, Kodaira; Banba Fumio, Saitama Pref. both of Japan

[73] Assignee: Bridgestone Corporation, Tokyo, Japan

[21] Appl. No.: 446,750

[22] Filed: Dec. 6, 1989

[30] Foreign Application Priority Data

Feb. 23, 1989 [JP] Japan .................................. 1-44648

[51] Int. Cl.$^5$ ................................................ C08K 3/04
[52] U.S. Cl. .................................... 524/495; 524/508; 524/511; 524/611; 524/570; 525/132
[58] Field of Search ................ 524/495, 508, 611; 525/132

[56] References Cited

U.S. PATENT DOCUMENTS 4,699,832 10/1987 Sattlemeyer .................... 524/507

Primary Examiner—Joseph L. Schofer
Assistant Examiner—Mark Sweet
Attorney, Agent, or Firm—Sughrue, Mion, Zinn, Macpeak & Seas

[57] ABSTRACT

A rubber composition used for passenger car tire, particularly as bead filler thereof comprises particular amounts of carbon black and at least one resin obtained by adding amine as a curing agent for resin to a novolak type phenolic resin modified with at least one of animal oil, vegetable oil, unsaturated oil, aromatic hydrocarbon and nitrile rubber for the provision of self curability, based on 100 parts by weight of particular rubber component usually used in the tire.

5 Claims, 1 Drawing Sheet

RUBBER COMPOSITIONS

BACKGROUND OF THE INVENTION

1. Field of the Invention

This invention relates to rubber compositions for tires, and more particularly to a super-hard rubber composition usable as a bead filler rubber as well as a passenger car tire using the same.

2. Related Art Statement

As to the bead portion structure of the radial tire, there have made various investigations for satisfying rigidity and durability required as a tire.

It has been attempted to improve the running performances and durability of the tire by arranging the bead reinforcing layer in the bead portion.

On the other hand, it has been well-known that the running performances are improved by arranging a super-hard rubber in the bead portion as disclosed in Japanese Utility Model Application Publication No. 47-16084, French Patent No. 1,260,138, U.S. Pat. No. 4,067,373 and the like.

However, satisfactory solution on the above problems have not yet been obtained by these conventional techniques. For this end, the inventors have previously proposed a rubber composition for bead filler obtained by compounding novolak type phenolic resin and/or novolak type modified phenolic resin modified with an oil or the like and hexamethylene tetramine (hereinafter referred to as hexamine simply) together with carbon black into natural rubber, polybutadiene rubber or the like as disclosed in Japanese Patent Application Publication No. 57-30856.

Moreover, the above Japanese Patent Application Publication No. 57-30856 discloses that a resin modified with an oil such as rosin oil, tall oil, cashew nut oil, linol oil, olein oil or the like, an aromatic hydrocarbon such as xylene or the like, or a rubber such as nitril rubber or the like as a novolak type modified phenolic resin is compounded into polyisoprene rubber or the like.

In the arrangement of the bead reinforcing layer, the production steps of tire becomes large, and the productivity is remarkably poor.

In the arrangement of the super-hard rubber, it is hardly considered that the function as the bead filler rubber is sufficiently developed under complicated input during the running of the tire to provide the durability required as a tire.

In order to solve these problems, in the technique proposed by the inventors, the novolak resin is cured in rubber through a curing agent such as hexamine, hexamethoxymethyl melamine or the like. Owing to the curing in rubber, the curing efficiency is poor as compared with the resin molding usually conducted only by mixing the resin and the curing agent, and a large amount of resin remains at an unreacted state. For this end, it is necessary to increase the compounding amount of the resin or to increase the amount of the curing agent for obtaining a desired hardness as a bead filler rubber.

However, when the compounding amount of the resin is increased, the amount of unreacted resin becomes naturally large. Such a unreacted resin degrades mechanical properties, particularly fatigue life and creep property of the rubber composition as a mere foreign matter and increases the heat build-up to shorten the fracture life of the tire.

On the other hand, when hexamine is used as a curing agent, if the amount of the curing agent is increased, the decrease of tenacity is caused due to the amine degradation of polyester fiber widely used as a reinforcing cord for adjoining carcass ply during the vulcanization of the tire or during the running of the tire. Particularly, this comes into problem when the tire is vulcanized at high temperature. When hexamethoxymethyl melamine is used as a curing agent, the decrease of tenacity in the polyester fiber is not caused, but there is still the problem due to the presence of the unreacted resin as previously mentioned because the curing efficiency is lower than that of hexamine.

Thus, the compounding of novolak type phenolic resin and curing agent such as hexamine or the like into rubber is a general means for increasing the hardness of rubber, but according to this means, a significant amount of unreacted resin remains in rubber because the curing reaction efficiency of the resin is poor, so that the mechanical properties of rubber, particularly dynamic modulus $E'$, fatigue life, creep property, heat build-up and the like are degraded to give unsatisfactory rubber properties. Therefore, when such a conventional rubber composition is used as a bead filler rubber, the tire performances are still insufficient.

SUMMARY OF THE INVENTION

It is an object of the invention to provide a rubber composition which can prevent the degradation of mechanical properties in rubber and carcass fiber cord due to the presence of unreacted resin and excessive amine without unnecessary increase of resin and curing agent when the hardness of rubber in the bead portion of the tire is particularly increased by using novolak type phenolic resin as well as tires using such a rubber composition.

The inventors have made various studies in order to solve the above problems and found that surprising synergistic effect is developed by modifying novolak type phenolic resin with an oil such as animal or vegetable oil and adding a curing agent to such a resin together with carbon black to provide a self curability, and as a result the invention has been accomplished.

According to the invention, there is the provision of a rubber composition comprising 20-130 parts by weight of carbon black and 1-30 parts by weight of at least one resin obtained by adding amine as a curing agent for resin to a novolak type phenolic resin modified with at least one of animal oil, vegetable oil, unsaturated oil, aromatic hydrocarbon and nitrile rubber for the provision of self curability, based on 100 parts by weight of at least one rubber selected from polyisoprene rubber (inclusive of natural rubber), polybutadiene rubber and styrene-butadiene copolymer rubber.

BRIEF DESCRIPTION OF THE DRAWING

The invention will be described with reference to the accompanying drawing, wherein.

DESCRIPTION OF THE PREFERRED EMBODIMENTS

Figure 1:
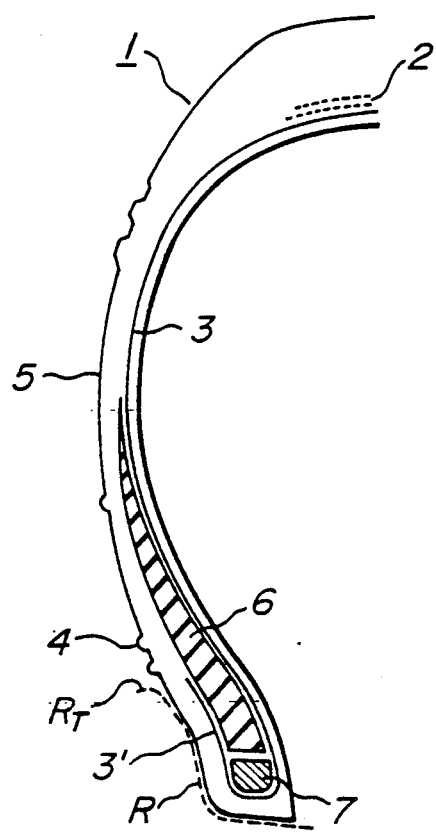
FIG. 1 is a schematically partial section view of a tire comprising a bead filler rubber composition according to the invention and used for the evaluation of tire performances.

In the rubber composition according to the invention, the amount of carbon black compounded is 20-130 parts by weight, preferably 60-120 parts by weight, more particularly 65-85 parts by weight based on 100 parts by weight of the above rubber component. When the amount of carbon black is less than 20 parts by weight, it is difficult to develop the reinforcing effect of the resin, while when it exceeds 130 parts by weight, the rubber becomes brittle and the durability of the rubber composition extremely degrades.

Furthermore, the amount of amine-containing novolak type modified phenolic resin compounded is 1-30 parts by weight, preferably 5-20 parts by weight based on 100 parts by weight of the rubber component.

When the amount of the resin is less than 1 part by weight, the effect by the compounding of the resin is less and the reinforcing effect can not be expected, while when it exceeds 30 parts by weight, the agglomerate of resin particles is formed in rubber to cause phase separation and hence the properties of the resulting rubber composition are considerably degraded.

According to the invention, additives usually used in rubber industry such as sulfur, vulcanizing agent, vulcanization accelerator, antioxidant, silica, process oil and the like may properly be added in addition to the above amine-containing novolak type modified phenolic resin and carbon black.

The rubber composition according to the invention is characterized by compounding a phenolic resin obtained by modifying novolak type phenolic resin, which is obtained by starting from phenol, cresol or resorcin, with at least one of animal and vegetable oils such as rosin oil, tall oil, cashew nut oil, linseed oil and the like; unsaturated oils such as linolic acid, oleic acid, linolenic acid and the like; aromatic hydrocarbons such as xylene, mesitylene and like; and rubber such as nitrile rubber and the like.

A most important feature of the invention lies in the use of amine-containing novolak type modified phenolic resin. Heretofore, amine such as hexamine or the like has been used together with the novolak type modified phenolic resin. In the latter case, the amine was added to rubber together with the novolak type modified phenolic resin, so that there were caused problems on the unreacted resin and free amine as previously mentioned. On the contrary, according to the invention, the amine-containing novolak type modified phenolic resin is used.

The amine used as a curing agent for resin in the invention is preferably hexamethylene tetramine as an aldehyde donor, and is previously added to the novolak type modified phenolic resin in an amount required for curing the resin. In the resin used in the invention, i.e. amine-containing novolak type modified phenolic resin, the ratio of amine added to the resin is calculated by an instrument analysis through high-speed liquid chromatography. The ratio of amine added as measured by this method is favorable to be not less than 70% by weight. Because, when the ratio is less than 70% by weight, the unreacted hexamine existent in the resin during the compounding with rubber disperses into rubber alone and the curing reaction speed of the resin considerably lowers, so that the given rubber properties are not obtained. Furthermore, the free amine results in the degradation of polyester fiber used for carcass reinforcement as previously mentioned.

The ratio of amine previously added to the novolak type modified phenolic resin according to the invention (hereinafter referred to as preaddition ratio) is measured by the following method.

A standard hexamine (99.0%, made by Tokyo Kasei Kogyo K. K.) is dissolved in THF, a calibration curve of which is determined through a gel permeation column chromatography.

Moreover, the column used is a RI-2 made by Shimazu Seisakusho, and the measurement is carried out by means of a differential refractomer (LC-830, made by Shimazu-Dupont K. K.).

The resin according to the invention is weighed at 50 mg and dissolved into 10 ml of THF, which is then measured in the same manner as mentioned above. As a result, the amount of unreacted hexamine in the resin is quantitied from the peak intensity of hexamine through the calibration curve, from which a quantity of nitrogen in the unreacted hexamine is calculated.

On the other hand, the resin according to the invention is subjected to an elementary analysis in the conventional manner to determine total nitrogen quantity of the resin. Then, the preaddition ratio of amine is calculated according to the following equation:

$$\text{preaddition ratio (weight \%)} = \frac{\left(\begin{array}{c}\text{total nitrogen quantity}\\\text{of resin}\end{array}\right) - \left(\begin{array}{c}\text{nitrogen quantity in}\\\text{unreacted hexamine}\end{array}\right)}{\text{total nitrogen quantity of resin}} \times 100$$

The rubber composition according to the invention can preferably be used for tires, particularly bead filler of the tire. This rubber composition is optimum as a bead filler rubber in passenger car tires using polyester fiber cords as a carcass reinforcement.

The following examples are given in illustration of the invention and are not intended as limitations thereof.

SYNTHESIS EXAMPLE 1

Into a glass flask of 1 l were charged 200 g of novolak resin (melting point: 80° C.), 150 g of water and 4 g of gum arabic, and the temperature was raised to 95° C. with stirring. A solution of 20 g of hexamethylene tetramine in 150 g of water was further added, and the liquid temperature was held at 95° C. for 15 minutes with stirring to conduct reaction.

Then, the reaction product was cooled to 30° C., added with 500 g of water and filtered through a filtering paper. The residue was washed with water to obtain resin particles. Next, the resin was dried at 35° C. under a reduced pressure (not more than 15 mmHg) for 24 hours to obtain particles of modified novolak resin. The preaddition ratio of amine as measured in the above method was 90% by weight. This resin was resin-A. The resin-A was amine preaddition type, but was a resin not modified with vegetable and animal oils, aromatic hydrocarbon or nitrile rubber.

SYNTHESIS EXAMPLE 2

Into a glass flask of 1 l were charged 200 g of novolak resin modified with cashew nut oil (melting point: 80° C.), 150 g of water and 4 g of gum arabic, and the temperature was raised to 95° C. with stirring. A solution of 20 g of hexamethylene tetramine in 150 g of water was further added, and the liquid temperature was held at 95° C. for 15 minutes with stirring to conduct reaction.

Then, the reaction product was cooled to 30° C., added with 500 g of water and filtered through a filtering paper. The residue was washed with water to obtain resin particles. Next, the resin was dried at 35° C. under a reduced pressure (not more than 15 mmHg) for 24 hours to obtain particles of modified novolak resin. The preaddition ratio of amine as measured in the above method was 93% by weight. This resin was resin-B.

SYNTHESIS EXAMPLE 3

A modified novolak resin was obtained in the same method as in Synthesis Example 1 except that the resin used was a novolak type phenolic resin modified with tall oil (melting point: 80° C.). The amine preaddition ratio was 94% by weight. This resin was resin-C.

Various rubber compositions (Examples 1-6, Comparative Examples 1-5) were prepared according to a compounding recipe shown in the following Table 1. Then, hardness, strength at rapture, 50% modulus, dynamic modulus $E'$, loss factor (tan $\delta$), fatigue life, influence to polyester fiber cord, lateral rigidity index, durability through special drum test and retention of PET strength were evaluated with respect to these rubber compositions. The results are shown in Table 1.

Moreover, the evaluation was carried out as follows:
(1) Hardness strength at rapture, 50% modulus
They were measured according to JIS K6301.
(2) Dynamic modulus, loss factor (tan $\delta$)
They were measured at room temperature by means of a viscoelastic spectrometer (VES-F type, made by Iwamoto Seisakusho) when the specimen having a thickness of 2 mm, a width of 4.7 mm and a length of 20 mm was subjected to dynamic strain of 1% and frequency of 50 Hz at a statically 5% elongated state.
(3) Influence to polyester fiber cord
After polyester fiber (polyethylene terephthalate (PET) fiber) cords were embedded in rubber, the curing was carried out at 160° C. for 90 minutes. Then, the cord was taken out from the vulcanizate and the cord strength was measured. By comparing the measured value with the original cord strength, the retention of elasticity of the cord was measured.
(4) Fatigue life The specimen having a thickness of 2 mm and a JIS-3 type shape was repeatedly subjected to dynamic fatigue at initial static load of 30 kg/cm$^2$ by means of a repetitive fatigue testing machine made by Sam Denshi Kikai K. K. whereby the repetitive number till the rapture of the specimen was measured.

In order to examine the effect to the tire, there was provided a test tire having a tire size of 165 SR13 as shown in FIG. 1, wherein two steel cord layers were used as a belt 2 and one carcass ply containing cords of polyethylene terephthalate (PET) fiber of 1500 d/2 was used as a carcass 3 and the turnup end 3' of the carcass was located in the vicinity of a rim flange R$_T$. In this tire 1, the rubber compositions of Examples 1, 3, 5, Comparative Examples 1, 3 and 4 shown in Table 1 were applied to a bead filler 6 of the tire 1, respectively. Such a tire was subjected to each of lateral rigidity test and special drum test, and the measured test results are shown in Table 1.

Moreover, the evaluation was as follows:
(5) Lateral rigidity index
The tire was mounted onto a rim of 4.1/2 J, inflated under an internal pressure of 1.7 kg/cm$^2$, and secured on a truck having saw-teeth like portions at its surface under a vertical load of 320 kg. Then, the truck was pulled in the side direction of the tire, during which lateral load produced at lateral displacement of 15 mm was measured. The measured lateral load was represented by an index on the basis that the rubber of Comparative Example 1 was 100.
(6) Durability through special drum test
The tire was mounted onto a rim of 4.1/2 J and run at a speed of 60 km/hr on a metal drum of 17 m in diameter under such excessive load and internal pressure that strain energy concentrated in the turnup end of the carcass ply is about 4 times that usually run in actual car, whereby the running distance till the occurrence of trouble in the turnup end was measured. The running distance of 30,000 km was acceptable.

TABLE 1(a)

|  | Example | | | | | | Comparative Example | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Natural rubber | 100 | 100 | 75 | 75 | 75 | 75 | 100 | 75 | 75 | 75 | 75 |
| Styrene-butadiene rubber |  |  | 25 | 25 |  |  |  | 25 | 25 | 25 | 25 |
| Butadiene rubber |  |  |  |  | 25 | 25 |  |  |  |  |  |
| Carbon black HAF | 80 | 80 | 80 | 80 | 80 | 80 | 80 | 80 | 80 | 80 | 80 |
| Process oil | 10 | 10 | 10 | 10 | 10 | 10 | 10 | 10 | 10 | 10 | 10 |
| ZnO | 5 | 5 | 5 | 5 | 5 | 5 | 5 | 5 | 5 | 5 | 5 |
| Antioxidant (Noclac 6C) | 1.5 | 1.5 | 1.5 | 1.5 | 1.5 | 1.5 | 1.5 | 1.5 | 1.5 | 1.5 | 1.5 |
| Vulcanization accelrator (Nocceler MSA) | 1 | 1 | 1 | 1 | 1 | 1 | 1 | 1 | 1 | 1 | 1 |
| Sulfur | 5 | 5 | 5 | 5 | 5 | 5 | 5 | 5 | 5 | 5 | 5 |
| Stearic acid | 2.5 | 2.5 | 2.5 | 2.5 | 2.5 | 2.5 | 2.5 | 2.5 | 2.5 | 2.5 | 2.5 |
| Hexamethylene tetramine |  |  |  |  |  |  | 5 | 3 | 3 |  |  |
| Conventional novolak type phenolic rein |  |  |  |  |  |  | 25 | 15 |  |  |  |
| Conventional novolak type phenolic resin modified with cashew nut oil |  |  |  |  |  |  |  |  | 15 |  |  |
| Novolak type modified phenolic resin (A) |  |  |  |  |  |  |  |  |  | 15 | 20 |
| Novolak type modified phenolic resin (B) | 25 |  | 15 |  | 20 |  |  |  |  |  |  |
| Novolak type modified phenolic resin (C) |  | 25 |  | 15 |  | 20 |  |  |  |  |  |

TABLE 1(b)

|  | Example | | | | | | Comparative Example | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| Hardness | 94 | 93 | 96 | 96 | 96 | 95 | 90 | 91 | 92 | 92 | 91 |
| Strength at rapture (kg/cm$^2$) | 158 | 154 | 148 | 146 | 146 | 145 | 130 | 126 | 138 | 141 | 136 |
| 50% modulus (kg/cm$^2$) | 110 | 106 | 116 | 114 | 112 | 108 | 55 | 61 | 70 | 65 | 62 |
| Dynamic modulus E' ($\times 10^8$ dyn/cm$^2$) | 13.8 | 13.4 | 14.8 | 14.7 | 14.2 | 14.0 | 9.5 | 10.1 | 11.2 | 10.9 | 10.1 |
| Dynamic loss factor | 0.209 | 0.211 | 0.223 | 0.222 | 0.206 | 0.205 | 0.230 | 0.260 | 0.241 | 0.232 | 0.226 |

TABLE 1(b)-continued

|  | Example | | | | | | Comparative Example | | | | |
| --- | --- | --- | --- | --- | --- | --- | --- | --- | --- | --- | --- |
|  | 1 | 2 | 3 | 4 | 5 | 6 | 1 | 2 | 3 | 4 | 5 |
| tan δ |  |  |  |  |  |  |  |  |  |  |  |
| Retention of strength in PET (%) | 92 | 91 | 98 | 98 | 94 | 95 | 65 | 74 | 76 | 98 | 95 |
| Fatigue life (× 10⁴) | 32.1 | 30.5 | 27.7 | 27.5 | 27.0 | 28.2 | 5.3 | 5.5 | 12.2 | 26.5 | 25.3 |
| Index of lateral rigidity | 110 |  | 113 |  | 112 |  | 100 |  | 103 | 102 |  |
| Special drum test | completely run over 30,000 km |  | completely run over 30,000 km |  | completely run over 30,000 km |  | completely run over 30,000 km |  | completely run over 30,000 km | completely run over 30,000 km |  |
| Retention of strength in PET (%) (before running/after running over 30,000 km) | 94/89 |  | 98/93 |  | 96/91 |  | 89/56 |  | 92/60 | 98/84 |  |

As seen from Table 1, the properties of rubber are somewhat improved in Comparative Example 3 using the novolak type phenolic resin modified with oil as compared with Comparative Example 2 using the conventional novolak type phenolic resin. This is considered to be due to the modification of novolak type phenolic resin with the oil.

Even in Comparative Example 4 using the resin-A obtained by previously adding amine to the novolak type phenolic resin (no modification with oil), the properties of rubber are improved as compared with Comparative Example 2. It is considered that the curing reaction efficiency is increased by previously adding the amine. Further, the amount of amine previously added can be suppressed at minimum by the improvement of the curing reaction efficiency, so that the retention of PET strength is improved.

On the contrary, when the amine previous added resin is added to the novolak type phenolic resin modified within oil as in Examples 1-6, the properties, particularly modulus of elasticity of rubber can considerably be improved by the synergistic effect of oil modification and amine previous addition. Furthermore, the amount of amine added can be suppressed at minimum by the effect of amine previous addition, so that the retention of PET strength is high level.

In the tire test data, the lateral rigidity index is high, so that when using the bead filler according to the invention, the steering stability is considerably improved. Particularly, when PET is used as a material for the carcass, the degradation of PET by amine is prevented to improve the durability.

As mentioned above, according to the invention, the hardness, strength at rapture, 50% modulus and dynamic modulus are high and the loss factor is low by the synergistic action of oil modification for novolak type phenolic resin and the previous addition of amine to the resin, and hence the modulus of elasticity can largely be improved. Furthermore, the amount of amine added can be suppressed at minimum by the effect of the amine previous addition, so that the retention of PET strength is high level. Moreover, when the rubber composition according to the invention is applied to the bead filler of the tire, the steering stability is considerably improved, and also the degradation of polyester fiber cords used in the carcass ply through the action of amine is prevented to improve the durability.

What is claimed is:

1. A rubber composition comprising:
   (A) 20-130 parts by weight of carbon black, and
   (B) 1-30 parts by weight of at least one resin obtained by previously reacting an amine, as a curing agent in an amount of not less than 70% by weight, with a novolak type phenolic resin modified with at least one of animal oil, vegetable oil, unsaturated oil and aromatic hydrocarbon, based on 100 parts by weight of at least one rubber selected from the group consisting of polyisoprene rubber inclusive of natural rubber polybutadiene rubber and styrene-butadiene copolymer rubber.

2. The rubber composition according to claim 1, wherein said novolak type modified phenolic resin is obtained by starting from at least one of phenol, cresol and resorcin.

3. The rubber composition according to claim 1, wherein said animal and vegetable oils are selected from the group consisting of rosin oil, tall oil, cashew nut oil and linseed oil, and said unsaturated oil is selected from linolic acid, oleic acid and linolenic acid.

4. The rubber composition according to claim 1, wherein said aromatic hydrocarbon is selected from the group consisting of xylene and mesitylene.

5. The rubber composition according to claim 1, wherein said amine is hexamethylene tetramine.

* * * * *